March 12, 1957 A. J. SOUCY 2,785,001
VEHICLE RAINSHIELD WITH SUCTION CUP ATTACHING STRIP
Filed Nov. 27, 1953

INVENTOR.
ARMAND J. SOUCY
BY
*H. G. Manning*
ATTORNEY.

United States Patent Office 2,785,001
Patented Mar. 12, 1957

2,785,001

VEHICLE RAINSHIELD WITH SUCTION CUP ATTACHING STRIP

Armand J. Soucy, Bristol, Conn.

Application November 27, 1953, Serial No. 394,621

1 Claim. (Cl. 296—95)

This invention relates to automotive accessories, and more particularly to a suction cup strip of soft rubber for detachably securing an auxiliary rainshield to the windshield of an automobile when parked in a drive-in theatre.

One object of the present invention is to provide a rainshield attaching strip of the above nature, which may readily be employed to detachably affix a rainshield to the windshield of a motor vehicle, whenever desired.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing, one form in which the invention may conveniently be embodied in practice.

Figure 1:
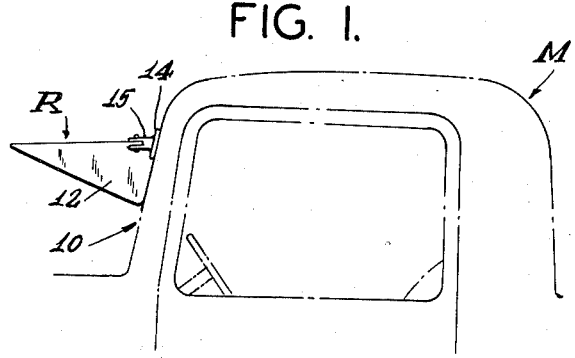
Fig. 1 represents a side view of a motor vehicle to which the improved rainshield attaching strip has been installed on the front of the windshield.
Figure 3:
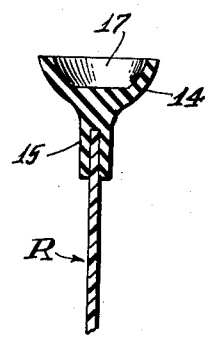
Fig. 3 is a fragmentary cross-sectional view of the same on a larger scale taken along the line 3—3 of Fig. 2.

Referring now to the drawing in which like reference numerals denote corresponding parts throughout the several views, the letter M indicates a motor vehicle having a windshield frame 10 located ahead of the front seat.

The rainshield of the present invention is indicated generally by the letter R and is attached to the upper glass portion of the front windshield 10.

The rainshield R is rectangular in shape and includes a flexible, plastic, transparent panel 11 having a pair of forwardly extending triangular end braces 12 and 13 for holding the rainshield R at the proper angular position from the windshield 10.

In order to hold the rainshield R in detachable position upon the windshield 10, provision is made of an elongated, soft rubber concave strip 14 extending the full length of the rainshield and having a slotted flange 15 which is provided with a row of spaced rivet apertures 16.

Figure 2:
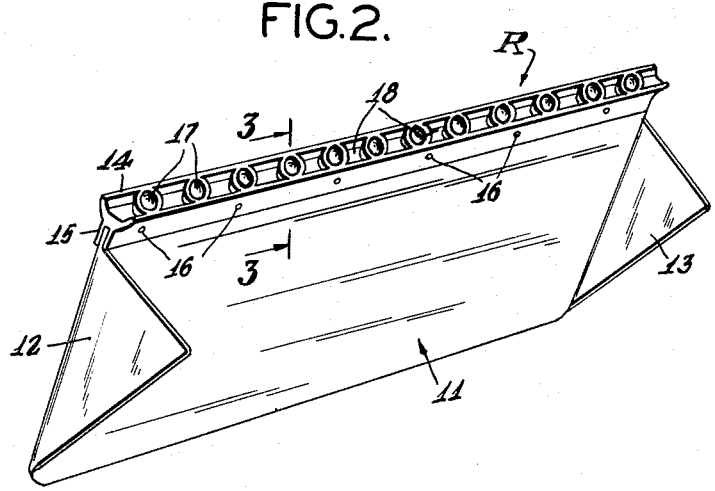
Fig. 2 is a perspective view of the rainshield and attaching strip as they appear when detached from the windshield of the automobile.

Provision is also made within the concave section of the strip 14 of a plurality of circular suction cups 17 spaced inwardly from the side edges of said strip 14 and spaced apart by a plurality of recesses 18 having flat sides and opposed inwardly extending convex ends, as clearly shown in Fig. 2.

Figure 5:
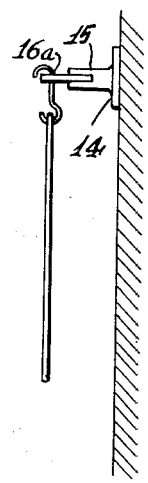
Fig. 5 is an end view, on a smaller scale, of one of the modified suction cup attaching strips as it appears when detachably secured to a wall for suspending a sign by a hook member connected to an aperture in said strip.
Figure 4:
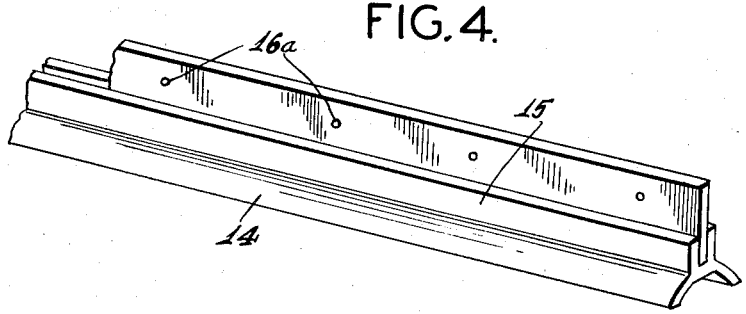
Fig. 4 is a perspective view of a modified form of attaching strip on a still larger scale shown by itself for use in suspending a sign.

In the modified form of the invention shown in Figs. 4 and 5, a narrow strip 19 having hook apertures 16a is cemented within the slotted flange 15 of the suction cup attaching strip 14.

*Operation*

In operation, the row of suction cups 17 will be first moistened, and the strip 14 will then be detachably secured to the windshield 10 of the parked motor vehicle M.

The strip 14 will thus hold the rainshield R tightly against the front surface of either a flat or curved windshield 10 to deflect the rain in such a manner so as to provide clear vision of the motion picture through the windshield 10 for the persons sitting in the vehicle M.

It will be understood that the rainshield R by reason of its flexibility will fit either a straight or curved windshield, and may be installed on any motor vehicle now in common use.

While there has been disclosed in this specification, one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention what is claimed as new and for which it is desired to secure Letters Patent is:

In a rainshield for the windshield of a motor vehicle parked in a drive-in theatre or elsewhere, a flexible transparent rectangular waterproof panel, an elongated soft rubber concave strip having a forwardly disposed slotted flange embracing the upper edge of said panel, and a pair of vertically spaced and rearwardly disposed flanges, said strip having a row of circular suction cups spaced inwardly from the upper and lower edges of said rearwardly disposed flanges, said cups being spaced apart by a plurality of intervening recesses having flat sides and opposed inwardly extending convex ends, said panel being provided at its ends with a pair of substantially triangular braces integrally secured thereto for holding said rainshield at a definite angle from said windshield.

References Cited in the file of this patent

UNITED STATES PATENTS

| Number | Name | Date |
|---|---|---|
| 868,413 | Cramer | Oct. 15, 1907 |
| 1,119,177 | Krafft | Dec. 1, 1914 |
| 1,155,705 | Cowell et al. | Oct. 5, 1915 |
| 1,255,300 | Dyblie | Feb. 5, 1918 |
| 1,478,279 | Henne | Dec. 18, 1923 |
| 1,509,759 | Huber | Sept. 23, 1924 |
| 2,227,541 | Groff | Jan. 7, 1941 |
| 2,285,660 | Howland | June 9, 1942 |
| 2,608,250 | Meyer | Aug. 26, 1952 |
| 2,642,248 | Semon | June 16, 1953 |